No. 667,154. Patented Jan. 29, 1901.
W. S. McDONALD & J. B. DAVIS.
ATTACHMENT FOR LEADING BICYCLES IN REAR OF VEHICLES.
(Application filed Nov. 12, 1900.)
(No Model.)
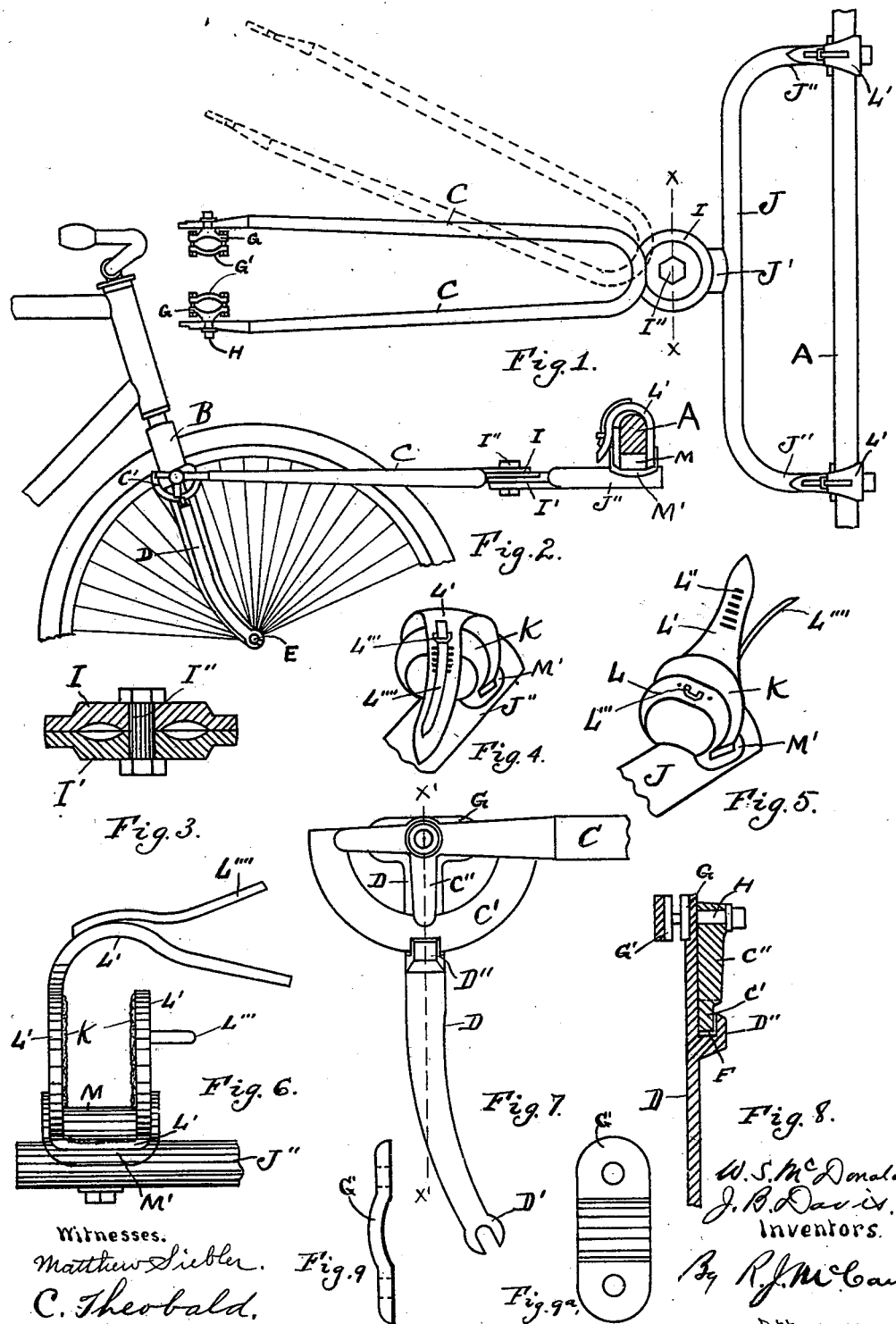

UNITED STATES PATENT OFFICE.

WINFIELD S. McDONALD AND JOHN B. DAVIS, OF DAYTON, OHIO, ASSIGNORS OF ONE-THIRD TO JNO. F. BRINKMAN, OF TERRE HAUTE, INDIANA.

ATTACHMENT FOR LEADING BICYCLES IN REAR OF VEHICLES.

SPECIFICATION forming part of Letters Patent No. 667,154, dated January 29, 1901.

Application filed November 12, 1900. Serial No. 36,179. (No model.)

*To all whom it may concern:*

Be it known that we, WINFIELD S. MCDONALD and JOHN B. DAVIS, citizens of the United States, residing at Dayton, in the county of Montgomery and State of Ohio, have invented certain new and useful Improvements in Attachments for Leading Bicycles in the Rear of Vehicles; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in bicycle attachments, and comprises means for leading a bicycle in the rear of a vehicle.

The invention is an improvement of the bicycle-leading attachment shown and described in United States Letters Patent No. 656,998, granted to us August 28, 1900.

The object of the invention is to improve the attachment shown and described in said Letters Patent; and to this end the present invention consists of the structural features hereinafter described and claimed.

In the accompanying drawings, Figure 1 is a top plan view of our improved attachment connected to the rear shaft of a vehicle. Fig. 2 is a side elevation of the same, showing a portion of the front wheel of a bicycle. Fig. 3 is a sectional view of the wheel or turn-table on the line $x\ x$ of Fig. 1. Figs. 4 and 5 are perspective views of the fastening device by means of which the attachment is secured to the rear shaft of a vehicle. Fig. 6 is an elevation of said device attached to an end of the bow. Fig. 7 is an enlarged elevation of the mechanism for attaching the device to the steering-fork of a bicycle. Fig. 8 is a sectional view of said mechanism on the line $x'\ x'$ of Fig. 7. Figs. 9 and 9$^a$ are views of one of the inside clamps.

The attachment is interposed between the rear axle A of a vehicle and the steering-fork B of the bicycle, and consists of the following mechanical elements.

C designates a fork which when secured to the fork B of the bicycle incloses the front wheel of the bicycle. The inner end of this fork on each side has a segmental portion or plate C', which is rigidly secured to the ends of said fork and is strengthened by a rib C'', which joins the ends of the fork and the center of said segment.

D is an arm or bracket which has the curvature of the forks B, and the lower end D' of which fits over the spindle E of the front wheel of the bicycle and is secured on each side by the spindle-nuts that are used for securing the steering-fork B to the spindle of the bicycle. The brackets or arms D have an offset D'', which provides a recess F, which serves as a keeper for the segmental plate C' and in which said plate moves whenever the fork C is raised or lowered by the vehicle. The upper ends of the brackets D, which terminate in clamping parts G, are rigidly secured to the fork B of the bicycle by inside clamps G'. The ends of the fork C are mounted on pivot-pins H, which project from the outer sides of the brackets D. This manner of connecting the fork C is essential, owing to the necessity of the said fork yielding vertically as the vehicle passes over inclines. The opposite end of the leading-fork C has an integral plate I, which is pivoted to a similar plate I' by means of a pin I''. The plate I' is extended from the bow J by means of a connecting portion J', the said portion J' and the plate I' being rigid with the bow J. By means of these two plates I and I' the fork C has a pivotal connection with the bow J, and as the vehicle turns the fork C will be permitted to turn on the pivot I'', and thus lead the bicycle in a proper manner by maintaining it in an upright position while turning a corner. The flat surfaces of the plates I and I' prevent the leading-fork C from twisting under the action of the bicycle. Consequently the bicycle is prevented from tilting to either side when being led. The curved ends J'' of the bow J are provided with fastening means, by which the device is attached to the rear axle A of the vehicle. These fastening means consist of a pad K, of any suitable soft material, which incloses the shaft A of the vehicle, and thereby any scratching or marring of the surface of the shaft is prevented. The pad K is secured to the inner side of a leather strap L, which is clamped to the ends J″ of the bow by means of metal plates M and M′ and is thereby made secure. The tongue portion L′ of the straps has a series of slots L″, which receive the staple L‴. When said staple is projected through one of said slots, the tongue L″″ is slipped through said staple, and the device is thus made secure, as shown in Figs. 1 and 2.

Having described our invention, we claim—

1. In an attachment for leading bicycles in the rear of a vehicle, the combination of a bow securable to the rear axle of a vehicle, a fork, clamps on the ends of said fork by which an attachment with the front forks of a bicycle is effected, a turn-table by which said fork and bow are pivotally connected so as to permit said fork to move in a horizontal plane, and a pivotal connection between the ends of said fork and the front forks of a bicycle, substantially as specified.

2. In an attachment for leading bicycles in the rear of a vehicle, the combination of brackets rigidly secured to the steering-fork of a bicycle, said brackets having recesses, and curvatures substantially corresponding to the curvatures of said steering-fork, a horizontal fork pivotally secured to said brackets to permit said fork to have vertical movement on said pivots, said horizontal fork having segmental portions C′ which project into the recesses in the brackets, a bow securable to the rear shaft of a vehicle, a plate rigidly projected from said bow, and a similar plate projected from the curved end of said horizontal fork the said plates fitting one upon the other, and a pivot-pin connecting said plates and whereby the horizontal fork and the bow are pivotally connected in a manner to permit of said horizontal fork turning in a horizontal plane while the plates serve to prevent said horizontal fork from tilting to either side, substantially as specified.

3. In an attachment for leading bicycles in the rear of vehicles, the combination of brackets adapted to be secured to the front spindle and to the steering-fork of a bicycle, a leading-fork having segmental plates which are pivotally connected to said brackets, the said segmental plates being movable within keepers on said brackets, a bow rigidly securable to the rear shaft of a vehicle, and a turn-table forming a pivotal connection between said bow and the leading-fork and by means of which said leading-fork is permitted to turn in a horizontal plane and is prevented from tilting while leading a bicycle, substantially as described.

In testimony whereof we affix our signatures in presence of two witnesses.

WINFIELD S. McDONALD.
JOHN B. DAVIS.

Witnesses:
R. J. McCARTY,
JOHN W. KALBFUS.